US012786159B2

(12) United States Patent
Gehtman et al.

(10) Patent No.: US 12,786,159 B2
(45) Date of Patent: Nov. 3, 2026

(54) DATA STORAGE SYSTEM USING COMBINED SERVICE-SUPPLIED AND ADMINISTRATOR-SUPPLIED NETWORK CONFIGURATION VALUES

(71) Applicant: Dell Products L.P., Round Rock, TX (US)

(72) Inventors: Yevgeni Gehtman, Modi'in (IL); Ophir Buchman, Raanana (IL); Marina Shem Tov, Hod Hasharon (IL)

(73) Assignee: Dell Products L.P., Round Rock, TX (US)

( * ) Notice: Subject to any disclaimer, the term of this patent is extended or adjusted under 35 U.S.C. 154(b) by 29 days.

(21) Appl. No.: 19/008,816

(22) Filed: Jan. 3, 2025

(65) Prior Publication Data

US 2026/0197295 A1 Jul. 9, 2026

(51) Int. Cl.
*H04L 61/5014* (2022.01)
*H04L 41/22* (2022.01)

(52) U.S. Cl.
CPC .......... *H04L 61/5014* (2022.05); *H04L 41/22* (2013.01)

(58) Field of Classification Search
None
See application file for complete search history.

(56) References Cited

U.S. PATENT DOCUMENTS 7,970,873 B2 6/2011 Nguyen et al.
2003/0142642 A1* 7/2003 Agrawal ............. H04L 61/5084 370/338
2010/0082779 A1* 4/2010 Min .................... H04L 61/5014 709/220

OTHER PUBLICATIONS

"Configure Network Settings," Posted at < https://docs.netapp.com/us-en/hci/docs/task_nde_configure_net_settings.html> on May 26, 2021 (Year: 2021).*
Gordon in "How to Set Up a Static IP Address," posted at < https://www.pcmag.com/how-to/how-to-set-up-a-static-ip-address> on Feb. 5, 2024 (Year: 2024).*
"AR500, AR510, AR531, AR550, AR1500, and AR2500 V200R010 CLI-based Configuration Guide—IP Service" as posted at < https://support.huawei.com/enterprise/en/doc/EDOC1100034231/5cef90ad/how-a-dhcp-server-allocates-network-parameters-to-new-dhcp-clients> on Apr. 13, 2022 (Year: 2022).*

* cited by examiner

*Primary Examiner* — Scott B Christensen
(74) *Attorney, Agent, or Firm* — BainwoodHuang

(57) ABSTRACT

A data storage system (DSS) initiates network operation by, in an exchange with a network configuration server (e.g., DHCP server), receiving a message including a server-selected network address and additional configuration information for services and components of the network. The DSS generates an address prefix and presents it with the additional configuration information to a network administrator, and it receives administrator-selected information including an administrator-generated static network address and at least some of the additional configuration information based on acceptance by the administrator. The DSS sets static network configuration according to the administrator-selected information without signaling acceptance of the server-selected address to the network configuration server, and subsequently engages in network data transfer operations over the network using the static network configuration.

17 Claims, 3 Drawing Sheets

DATA STORAGE SYSTEM USING COMBINED SERVICE-SUPPLIED AND ADMINISTRATOR-SUPPLIED NETWORK CONFIGURATION VALUES

BACKGROUND

The present invention is related to the field of network configuration of network-attached systems such as data storage systems.

SUMMARY

A data storage system (DSS) initiates network operation by, in an exchange with a network configuration server (e.g., DHCP server), receiving a message including a server-selected network address and additional configuration information for services and components of the network. The DSS generates an address prefix and presents it with the additional configuration information to a network administrator, and it receives administrator-selected information including an administrator-generated static network address and at least some of the additional configuration information based on acceptance by the administrator. The DSS sets static network configuration according to the administrator-selected information without signaling acceptance of the server-selected address to the network configuration server, and subsequently engages in network data transfer operations over the network using the static network configuration. The technique can improve ease and accuracy of configuring network devices such as data storage systems, while still allowing for administrator assignment of static network addresses as may be required in operating environments.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

Configuring network settings for network devices such as data storage system can be complex and error-prone, especially when static network addresses are being used. A traditional manual setup process requires users to input various network parameters, such as netmask, default gateway, addresses for DNS and NTP servers, and more, which can be overwhelming storage or network administrators and lead to configuration errors.

A disclosed technique relates to a method and system for assisted network configuration of data storage devices in environments that offer a network-accessed configuration service such as Dynamic Host Configuration Protocol (DHCP) service. An objective is to simplify the network setup process by leveraging DHCP to provide essential network configuration data that can be used as a hint (or baseline) for actual configuration, which will typically include administrator-selected configuration (such as static network address) as well. The approach can reduce the complexity and potential for errors in network configuration and provide a more user-friendly setup experience. The technique may be particularly beneficial in environments where ease of setup and reliability are critical, such as in enterprise networks and home network-attached storage (NAS) systems.

More specifically, the technique is particularly useful in systems where it is desired or necessary to configure static network addresses for infrastructure equipment rather than using dynamic (DHCP-assigned) addresses for reasons such as the following:

Consistency and Predictability:

- Using static IP addresses ensures that each storage device holds a consistent network address. This consistency is crucial for network management, troubleshooting, and ensuring that services relying on specific network addresses (like remote access) function correctly without interruption.

Enhanced Security:

- Static network addresses can enhance security by limiting the range of addresses that can access and communicate with the configured device (e.g., storage system). Using a static address makes it easier to implement security policies such as access control lists (ACLs) and firewall rules, which can be more challenging with dynamically assigned addresses.

Details of the above are given below in the context of example systems and environments. The present description is focused on a common use case of Internet Protocol (IP) networks and related services, including Dynamic Host Control Protocol (DHCP). In this context, the network addresses are commonly referred to as IP addresses. Those skilled in the art will understand the extension of this example to other network environments.

EMBODIMENTS

Figure 1:
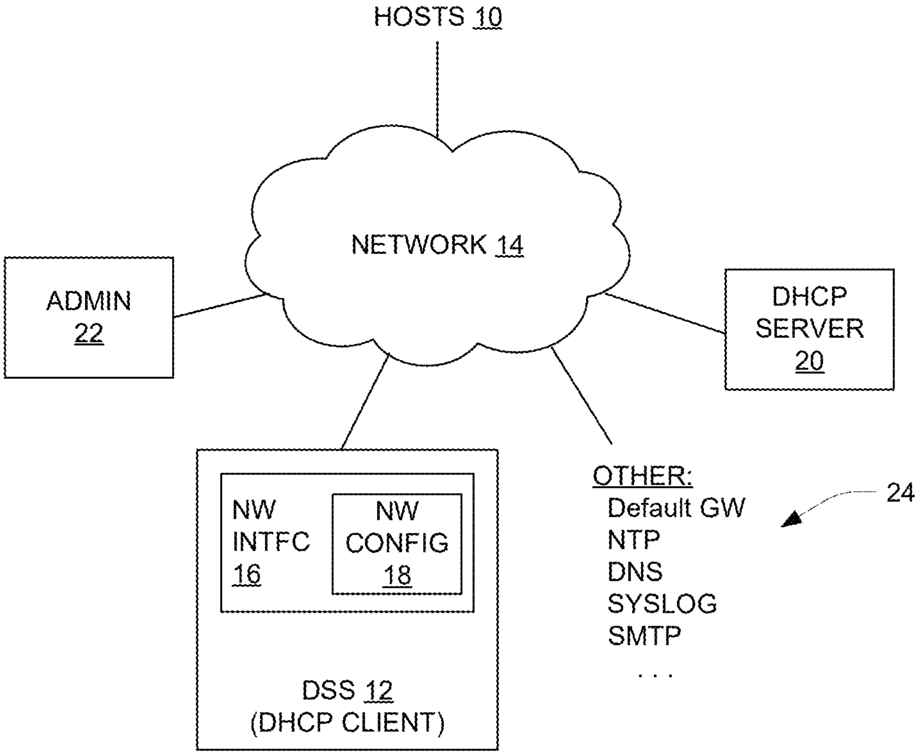
FIG. 1 is a block diagram of a networked computer system.

FIG. 1 shows a computing system in which a set of host computers (HOSTs) 10 access secondary data storage provided by a data storage system (DSS) 12 via a network 14. As generally known, the DSS 12 is a specialized device with nonvolatile storage resources (e.g., Flash memory arrays, magnetic disks, etc.) and storage processing circuitry that executes computer program instructions to realize the complex functionality of a modern data storage system, e.g., host data access, data abstraction/virtualization, data protection, compression, etc. Insofar as such structure and functionality are generally known, they are not elaborated herein. The present description focuses primarily on functionality of network interface (NW INTFC) circuitry 16 including creation and use of network configuration (NW CONFIG) information 18. Typically, network-layer functionality including configuration operations as described herein are performed by execution of lower-level computer program instructions such as in a network driver, etc. It will be appreciated that embodiments may be realized by method (sequences of operations), systems/devices (e.g., a DSS), and by non-transitory computer-readable medium containing instructions that cause a computerized system/device (e.g., DSS) to operate in the specified manner.

As shown, the system also includes various additional network-connected components including a DHCP server 20, administrator system (ADMIN) 22, and other network-accessed servers/services (OTHER) 24 such as a default gateway (GW), network time protocol (NTP) service, Domain Name System (DNS), system log (SYSLOG), and Simple Mail Transfer Protocol (SMTP) for example. Some or all of these are accessed by DSS 12 in operation, and thus it is part of the initial network configuration process to obtain information enabling the DSS 12 to access these services 24.

Figure 2:
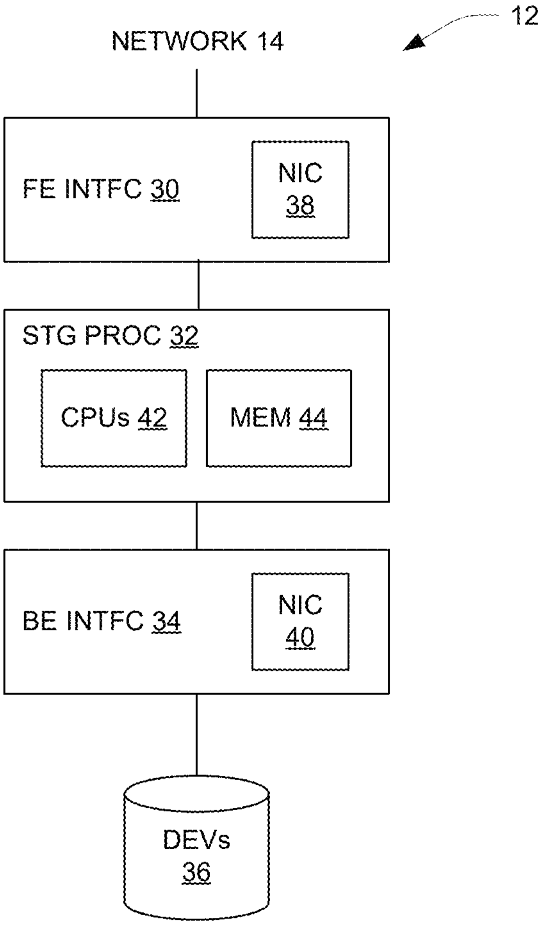
FIG. 2 is a block diagram of a data storage system.

FIG. 2 shows details of the DSS 12 from a hardware perspective, in one embodiment. It includes front-end interface circuitry (FE INTFC) 30, storage processing circuitry (STG PROC) 32, back-end interface circuitry (BE INTFC) 34, and nonvolatile storage devices (DEVs) 36 as indicated above. The front-end interface circuitry 30 interfaces the DSS 12 to the network 14 using one or more network interface cards (NICs) 38, and the back-end interface circuitry 34 provides an interface between the storage processing circuitry 32 and the storage devices 36, also typically using one or more NICs 40. The storage processing circuitry 32 includes one or more CPUs 42 and memory 44 as shown, and in operation it stores and executes computer program instructions to provide overall data storage functionality including the network-associated functionality, as mentioned above. It will be appreciated that the network interface 16 of FIG. 1 is generally realized by a combination of the front-end interface circuitry 30 and certain program components executed by the storage processing circuitry, e.g., a network driver as mentioned above.

Various management operations such as configuration, monitoring, troubleshooting, etc. are conducted by one or more administrative users via administrator system(s) 22. The present description focuses primarily on certain details of configuring the DSS 12 for network operations. References to an "administrator" herein should be understood as involving an 0 example a specialized graphical user interface (GUI) and management communications with the DSS 12, as generally known. Other specific arrangements and interfaces to an administrative user may be used. Also, in some cases the administrative entity may be realized at least in part by specialized high-level software.

To initially set up DSS 12 for network operation, it typically requires an administrator to provide the following basic network-related settings:

A management IP address
A network subnet mask (netmask)
A default gateway address Additional network-related configurations may include the following:

A static routing table
An NTP server address
A time zone
An SMTP server address
A DNS server address
A host and network name (FQDN)

As noted, the setup process can be challenging. It generally requires a good understanding of networking concepts. It can be overwhelming and prone to mistakes, as various administrators may be involved in a setup process (e.g., a storage admin and a network admin are two different people/entities involved in setting up a new storage device). Entering each network parameter can also be time-consuming.

In various embodiments, a solution leverages configuration and "options" information provided by a DHCP server (e.g., DHCP server 20) during a messaging exchange per the DHCP protocol to provide input recommendations for an administrator during setup, while still allowing for administrator control over important items including configuration of a static network address, for example. In the context of DHCP, this can be done by obtaining information in an "Offer" phase of the protocol without proceeding to succeeding Request/Acknowledgement phases typically used for DHCP dynamic address assignment.

Figure 3:
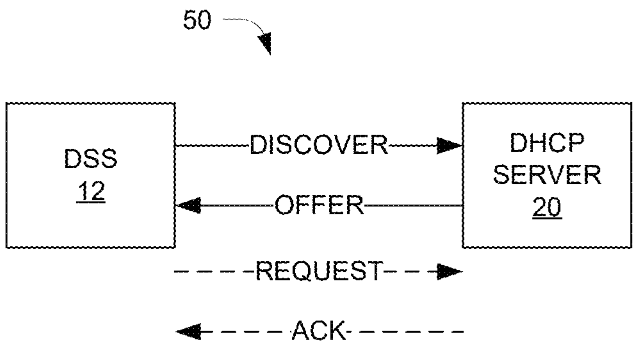
FIG. 3 is a schematic diagram of a DHCP message exchange between a client and server.

FIG. 3 illustrates the DHCP protocol exchange 50 between the DSS 12 and DHCP server 20 as mentioned above. The DHCP IP address allocation protocol is designed to operate in four phases:

| Phase | Description |
|---|---|
| Discover | The DHCP client (DSS 12) sends a DHCP Discover message (broadcast) to locate available DHCP servers on the network. |
| Offer | A DHCP server responds with a DHCP Offer message, providing an available IP address and other network configuration details. |
| Request | The client replies with a DHCP Request message, indicating its acceptance of the offered IP address and configuration. |
| Acknowledgment | The DHCP server sends a DHCP Acknowledgment message, confirming the IP address lease and finalizing the configuration. |

In FIG. 3 the Request and Acknowledgment (ACK) messages are shown in dashed lines to indicate that they are not used in the presently disclosed technique, as described more below.

In typical operation where dynamic acquisition of network address and configuration is desired, it is necessary for the DHCP client and DHCP server to communicate and follow through all four phases. However, the DHCP protocol does allow for certain interruptions without causing inconsistencies on either the client's or the server's side. For example:

A client sends a "Discover" but does not listen to the Offer provided.
The server makes an "Offer" to the client, but the client never responds.
The client makes a "Request," but the server never responds.

As described below, such resiliency/tolerance of the DHCP protocol is exploited to provide for an enhanced configuration technique. First, certain additional functionality of the DHCP protocol and DHCP services is also described.

The DHCP protocol allows a DHCP client to receive, in addition to an assigned network address, additional network-related configuration which are contained in "Options" fields of a DHCP Offer message. These Options can include the following:

| Tag ID | Description |
|---|---|
| 1 | Subnet Mask |
| 2 | Time zone offset (in seconds) |
| 3 | Default Gateway IP Address |
| 4 | Time server (NTP) |
| 6 | Domain Name Server IP Address |
| 7 | Remote syslog server |
| 12 | Hostname |
| 15 | Domain name |
| 33 | Static routes (destination + gateway) |
| 69 | SMTP Servers |

Thus, by issuing a Discover and receiving an Offer, DSS 12 receives much environment information about network 14. DSS 12 does not accept the Offer, but it does leverage the Offer payload to ease the configuration burden on an administrator in systems for which some information (such as network addresses) must be statically rather than dynamically assigned. Referring to FIG. 3, the Request and Acknowledgment messages that are included in the normal/specified DHCP exchange are not performed, so that no dynamic assignment of an offered network address is made.

Figure 4:
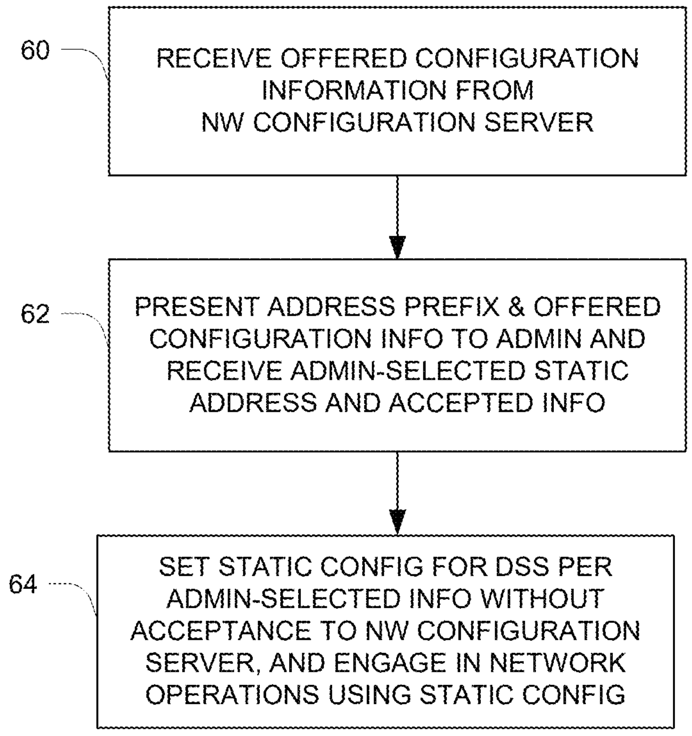
FIG. 4 is a high-level flow diagram of network configuration-related operation.

FIG. 4 illustrates pertinent configuration-related operation used as part of initiating network operation of a data storage system (e.g., DSS 12).

At 60, in an exchange with a network configuration server for a network (e.g., DHCP server 20), receives a message (e.g., DHCP Offer) including a server-selected network address and additional configuration information for services and components of the network, for use by the data storage system.

At 62, the DSS generates an address prefix and presents the address prefix and the additional configuration information to a network administrator and receiving administrator-selected information, such as via a GUI at an administrator system 22 as described above. The address prefix is generated based on the server-selected network address, and the administrator-selected information including an administrator-generated static network address and at least some of the additional configuration information based on acceptance by the administrator. These aspects of operation are described further with reference to an illustrative example below.

At 64, the DSS sets a static network configuration (e.g., network configuration information 18) of the data storage device according to the administrator-selected information, without signaling acceptance of the server-selected address to the network configuration server (e.g., without succeeding Request/Acknowledgement messages), and subsequently engages in regular network data transfer operations over the network using the static network configuration.

Example—Assisting an Administrator with Network Configuration

In an example process, the DSS 12 can initiate configuration operation by issuing a DHCP Discover message on the network 14 and receive a DHCP Offer message from the DHCP server 22. These messages employ a broadcast address (e.g., IPv4 255.255.255.255) because the DSS 12 has no assigned IP address yet. Once a DHCP Offer is received, its information is harvested by DSS 12, and the following recommendations can be made, e.g., by the DSS 12 populating respective fields of an administrative GUI at the administrator system 22:

IP Address and Subnet Mask

The received subnet mask can be offered to the admin as is.

The received IP address may be used as shown below, i.e., to generate an address prefix value that is proposed to the administrator.

| Field | Received Offer Value | Suggested Admin Value |
|---|---|---|
| Subnet Mask | 255.255.255.0 | 255.255.255.0 |
| IP Address | 192.168.0.1 | 192.168.0.XXX |

Time Zone Offset (in Seconds)

The received time zone offset can be offered to the admin as is.

Default Gateway IP Address

The received default gateway IP address can be offered to the admin as is.

Time Server (NTP)

The received NTP server IP address can be offered to the admin as is.

Domain Name Server IP Address

The received DNS server IP address can be offered to the admin as is.

Remote Syslog Server

The remote syslog IP address that was received can be offered to the admin as is.

Host and Domain name

The host and domain names can be offered to the admin as is.

Static Routes (Destination+Gateway)

The received static routes can be offered to the admin.

SMTP Servers

The received SMTP server IP address can be offered to the admin as is.

In response to the presentation of configuration information by the DSS 12 as described above, an administrator can selectively accept or modify various configuration items as needed, then by action of the administrative GUI instruct the DSS 12 to incorporate the finalized configuration as the network configuration information 24. It is expected that for many of the environment items identified in DHCP Options as described above, the administrator will typically just accept them, unless there is some particular reason for overriding them with other values. Regarding the network address, in an environment requiring static network addresses such as noted above, the administrator will replace the offered network address prefix with a specific static network address for use by DSS 12. The static network address may be based on the network address prefix that the DSS has provided based on the DHCP-supplied address, or in other cases an administrator may have reasons for selecting an address having a different prefix value. Referring to the above example of the prefix value of 192.168.0.XXX, the administrator may specify a static IP address somewhere in the range of 192.168.0.1 to 192.168.0.255 for example.

While the above description is focused on initial configuration of the DSS 12, such as when initially installed for example, the disclosed technique also supports ongoing operation. In one scenario an administrator modifies a configured system's configuration based at least partly on receiving suggestions that can be accepted. As an example, an organization may change its NTP server IP address and the administrator needs to reconfigure the DSS 12 to modify stored NTP server address stored in the network configuration information 18. The administrator can issue control to the DSS 12 to cause it to re-initiate configuration by sending a Discover, receiving an Offer, etc. as described above. In this scenario the DHCP server 20 supplies the new NTP server address in the corresponding Option of the Offer, which is then presented to the Administrator who by accepting it causes the DSS 12 to update the NTP server address in its stored configuration 18.

The following are potential benefits of using the presently disclosed technique:

1. Reduced Configuration Errors:

By leveraging DHCP to provide essential network configuration data as a baseline, the method minimizes the chances of user input errors. This ensures that critical network parameters like netmask, default gateway, DNS, and NTP servers (and others) are correctly configured, leading to more reliable network setups.

2. Simplified User Experience:
   The approach significantly simplifies the network setup process for users, especially those needing to be more technically proficient. Suggesting reliable initial configuration values reduces the complexity and makes the setup process more accessible and less intimidating.
3. Enhanced Setup Efficiency:
   This method speeds up the network configuration process by automating the retrieval of network settings. Users can quickly and efficiently set up new storage devices without manually inputting multiple network parameters, saving time and effort.

ADDITIONAL INFORMATION

Those skilled in the art will appreciate that DHCP is essentially an evolved version of the older BOOTP protocol which includes similar functionality and could be an alternative mechanism for obtaining the server-provided configuration information.

There are multiple protocols that can provide a system with configuration once an IP address is acquired. For example:

Zero-Touch Provisioning (ZTP)

Purpose: ZTP automates the initial configuration of network devices when they first connect to the network, typically in large-scale environments. ZTP is commonly used for routers, switches, and wireless access points.

How it works: When a device is powered on, it uses DHCP to obtain network parameters. It then connects to a provisioning server (via TFTP, HTTP, or HTTPS) to download a configuration file, which automatically configures the device.

Provisioning Servers (e.g., PXE Boot)

Purpose: Preboot Execution Environment (PXE) is a method used to boot a device over the network and assign configuration settings.

How it works: A new device boots from the network (instead of from a local hard drive) using PXE. The provisioning server then delivers a boot image, which contains the necessary operating system and configuration files.

As mentioned above, an administrator may be one of multiple personas/entities, e.g.:

1. Network Administrators: They are responsible for configuring and managing network settings, including IP addresses and DNS configurations. They ensure that the storage device is properly integrated into the network.
2. System Administrators: These professionals often configure NTP (Network Time Protocol) settings to ensure that all devices within the network are synchronized with the correct time.
3. Storage Administrators: In larger organizations, dedicated storage administrators might specialize in managing storage systems. They work closely with network and system administrators to configure and maintain storage devices.
4. IT Support Engineers: In smaller organizations, IT support engineers or general IT staff might take on these responsibilities, handling a broader range of tasks, including network, system, and storage configurations.

There are software solutions that can automate device configuration, generally still relying on some pre-established base configuration (e.g., IP address, etc.). These provide value after the initial configuration. Examples include:

1. Network Automation Tools: These tools, such as Ansible, Puppet, and Chef, allow for the automated configuration and management of network devices. They use scripts and playbooks to define the desired network state, which can then be applied consistently across multiple devices.
2. Software-Defined Networking (SDN): SDN separates the control plane from the data plane in network devices, allowing for centralized control and automation of network configurations. This makes it easier to manage and automate network changes.
3. Network Configuration Management (NCM): NCM tools automate the configuration and management of network devices like routers, switches, and firewalls. They ensure that configurations are consistent and compliant with organizational policies.

The individual features of the various embodiments, examples, and implementations disclosed within this document can be combined in any desired manner that makes technological sense. Furthermore, the individual features are hereby combined in this manner to form all possible combinations, permutations, and variants except to the extent that such combinations, permutations, and/or variants have been explicitly excluded or are impractical. Support for such combinations, permutations and variants is considered to exist within this document.

While various embodiments of the invention have been particularly shown and described, it will be understood by those skilled in the art that various changes in form and details may be made therein without departing from the scope of the invention as defined by the appended claims.

What is claimed is:

1. A method of configuring a data storage system for network operation, comprising:

in a specified four-phase DHCP exchange with a Dynamic Host Control Protocol (DHCP) server for a network, receiving an Offer message of an Offer phase of the exchange, including a server-selected network address and additional configuration information for services and components of the network, for use by the data storage system;

generating an address prefix and presenting the address prefix and the additional configuration information to a network administrator and receiving administrator-selected information, the address prefix being generated based on the server-selected network address, the administrator-selected information including an administrator-generated static network address and at least some of the additional configuration information based on acceptance by the administrator;

setting a static network configuration of the data storage system according to the administrator-selected information without signaling acceptance of the server-selected address to the network configuration server, and subsequently engaging in regular network data transfer operations over the network using the static network configuration; and wherein setting the static network configuration is performed using only information harvested from DHCP Options in the Offer message and without performing succeeding Request and Acknowledgement phases of the specified four-phase DHCP exchange with the DHCP server.

2. The method of claim 1, further including, as part of the exchange with the DHCP server, sending a DHCP Request message in a Request phase preceding the Offer phase.

3. The method of claim 1, wherein the Offer message includes a plurality of DHCP Options fields for respective configuration items selected from Subnet Mask, Time zone offset, Default Gateway Address, Time server address, Domain Name Server address, Remote syslog server address, Hostname, Domain name, Static routes, and SMTP Servers.

4. The method of claim 1, wherein the presenting and receiving are performed using a graphical user interface (GUI) of an administrator system, the data storage system communicating the address prefix and the additional configuration information to the administrator system for display to the administrator via the GUI, the data storage system receiving administrator-selected information from the administrator system based on entry of the administrator-generated static network address and acceptance of the at least some additional configuration information by the administrator.

5. The method of claim 1, wherein generating the address prefix includes selecting a prefix portion of the server-selected network address.

6. The method of claim 1, performed both during initial operation of the data storage system when no network configuration information has yet been established, and during a subsequent re-configuring operation to modify an existing configuration of the data storage system based at least partly on new server-selected information presented to and accepted by the administrator.

7. A data storage system having nonvolatile storage resources for storing host data, storage processing circuitry, and network interface circuitry providing an interface to a network to which the data storage system is connected in operation, the data storage system being structured and operative to become configured for network operation by configuration operations including:

in a specified four-phase DHCP exchange with a Dynamic Host Control Protocol (DHCP) server for a network, receiving an Offer message of an Offer phase of the exchange, including a server-selected network address and additional configuration information for services and components of the network, for use by the data storage system;

generating an address prefix and presenting the address prefix and the additional configuration information to a network administrator and receiving administrator-selected information, the address prefix being generated based on the server-selected network address, the administrator-selected information including an administrator-generated static network address and at least some of the additional configuration information based on acceptance by the administrator;

setting a static network configuration of the data storage system according to the administrator-selected information without signaling acceptance of the server-selected address to the network configuration server, and subsequently engaging in regular network data transfer operations over the network using the static network configuration; and wherein setting the static network configuration is performed using only information harvested from DHCP Options in the Offer message and without performing succeeding Request and Acknowledgement phases of the specified four phase DHCP exchange with the DHCP server.

8. The data storage system of claim 7, further structured and operative, as part of the exchange with the DHCP server, to send a DHCP Request message in a Request phase preceding the Offer phase.

9. The data storage system of claim 7, wherein the Offer message includes a plurality of DHCP Options fields for respective configuration items selected from Subnet Mask, Time zone offset, Default Gateway Address, Time server address, Domain Name Server address, Remote syslog server address, Hostname, Domain name, Static routes, and SMTP Servers.

10. The data storage system of claim 7, wherein the presenting and receiving are performed using a graphical user interface (GUI) of an administrator system, the data storage system communicating the address prefix and the additional configuration information to the administrator system for display to the administrator via the GUI, the data storage system receiving administrator-selected information from the administrator system based on entry of the administrator-generated static network address and acceptance of the at least some additional configuration information by the administrator.

11. The data storage system of claim 7, wherein generating the address prefix includes selecting a prefix portion of the server-selected network address.

12. The data storage system of claim 7, further structured and operative to perform the configuration operations both during initial operation of the data storage system when no network configuration information has yet been established, and during a subsequent re-configuring operation to modify an existing configuration of the data storage system based at least partly on new server-selected information presented to and accepted by the administrator.

13. A non-transitory computer-readable medium storing computer program instructions executable by storage processing circuitry of a data storage system to cause the data storage system to become configured for network operation by configuration operations including:

in a specified four-phase DHCP exchange with a Dynamic Host Control Protocol (DHCP) server for a network, receiving an Offer message of an Offer phase of the exchange, including a server-selected network address and additional configuration information for services and components of the network, for use by the data storage system;

generating an address prefix and presenting the address prefix and the additional configuration information to a network administrator and receiving administrator-selected information, the address prefix being generated based on the server-selected network address, the administrator-selected information including an administrator-generated static network address and at least some of the additional configuration information based on acceptance by the administrator;

setting a static network configuration of the data storage system according to the administrator-selected information without signaling acceptance of the server-selected address to the network configuration server, and subsequently engaging in regular network data transfer operations over the network using the static network configuration; and wherein setting the static network configuration is performed using only information harvested from DHCP Options in the Offer message and without performing succeeding Request and Acknowledgement phases of the specified four-phase DHCP exchange with the DHCP server.

14. The non-transitory computer-readable medium of claim 13, wherein the exchange with the DHCP server includes sending a DHCP Request message in a Request phase preceding the Offer phase.

15. The non-transitory computer-readable medium of claim 13, wherein the Offer message includes a plurality of DHCP Options fields for respective configuration items selected from Subnet Mask, Time zone offset, Default Gateway Address, Time server address, Domain Name Server address, Remote syslog server address, Hostname, Domain name, Static routes, and SMTP Servers.

16. The non-transitory computer-readable medium of claim 13, wherein the presenting and receiving are performed using a graphical user interface (GUI) of an administrator system, the data storage system communicating the address prefix and the additional configuration information to the administrator system for display to the administrator via the GUI, the data storage system receiving administrator-selected information from the administrator system based on entry of the administrator-generated static network address and acceptance of the at least some additional configuration information by the administrator.

17. The non-transitory computer-readable medium of claim 13, wherein the instructions provide for performing the configuration operations both during initial operation of the data storage system when no network configuration information has yet been established, and during a subsequent re-configuring operation to modify an existing configuration of the data storage system based at least partly on new server-selected information presented to and accepted by the administrator.

* * * * *